H. & J. G. WARNER.
NUT LOCK.
APPLICATION FILED JAN. 16, 1917.

1,263,169.

Patented Apr. 16, 1918.
2 SHEETS—SHEET 1.

WITNESS

INVENTORS
Henry Warner &
Jacob G. Warner
BY Victor J. Evans
ATTORNEY

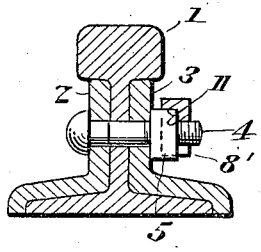
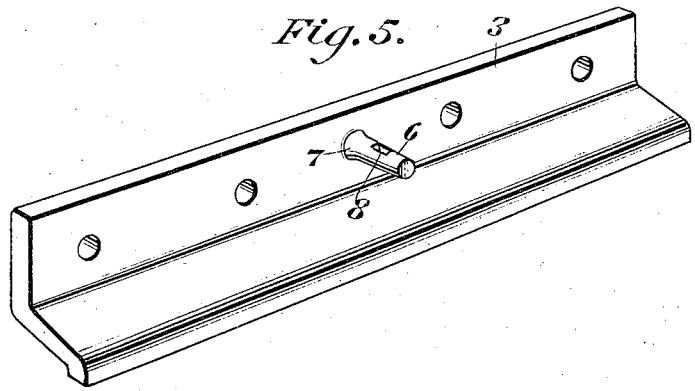
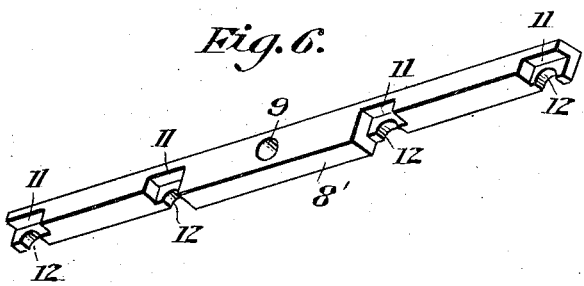

UNITED STATES PATENT OFFICE.

HENRY WARNER AND JACOB G. WARNER, OF PINE GROVE, PENNSYLVANIA.

NUT-LOCK.

1,263,169.

Specification of Letters Patent.

Patented Apr. 16, 1918.

Application filed January 16, 1917. Serial No. 142,681.

*To all whom it may concern:*

Be it known that we, HENRY WARNER and JACOB G. WARNER, citizens of the United States, residing at Pine Grove, in the county of Schuylkill and State of Pennsylvania, have invented new and useful Improvements in Nut-Locks, of which the following is a specification.

The present invention relates to nut locks, and is particularly designed for use in connection with the joint of railway rails and wherein a single element is provided to engage with all of the nuts upon the securing bolts to hold the same against turning.

An object of the invention is to produce a nut locking means of this character which shall be of a simple nature, which may be easily and quickly applied so as to positively hold the nuts against rotation and also which may be readily removed to permit of the unscrewing of the nuts from the bolts, as for instance, when repairs are to be made to the joint.

With the above and other objects in view the improvement resides in the construction, combination and arrangement of parts set forth in the following specification and falling within the scope of the appended claim.

In the drawings:

Fig. 4 is a similar sectional view on the line 4—4 of Fig. 1,

Fig. 5 is a perspective view of one of the bars or angle plates for the rail joint, and Fig. 6 is a perspective view of the nut engaging member looking toward the inner face thereof.

Figure 1:
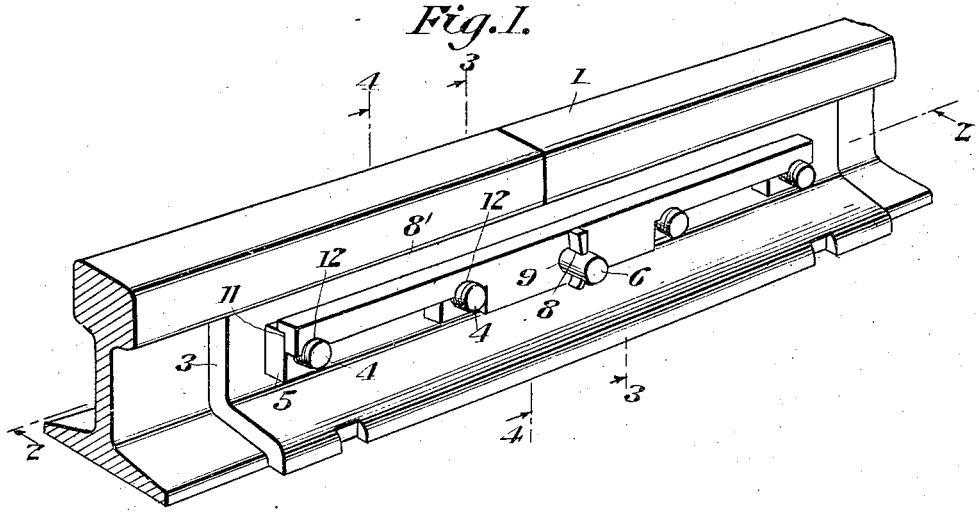
Figure 1 is a perspective view illustrating the application of the improvement.
Figure 2:
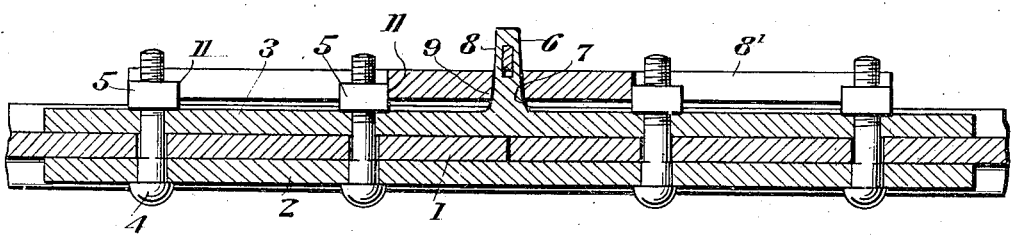
Fig. 2 is a horizontal sectional view approximately on the line 2—2 of Fig. 1.
Figure 3:
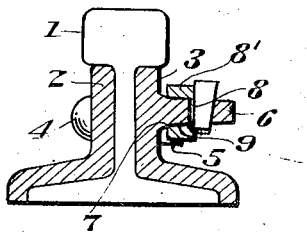
Fig. 3 is a sectional view on the line 3—3 of Fig. 1.

Referring to the drawings in detail, the numerals 1 designate the meeting ends of two railway rails, 2 and 3 the bars or plates disposed in the fishing spaces of the rails to bridge the joint thereof, 4 the bolts passing through alining openings in the webs of the rails and through the plates 2 and 3, the said bolts adjacent their heads being formed with the usual lugs to prevent the turning thereof. The bolts 4 have their threaded ends projecting through the openings in the plate 3, and screwed upon the said bolts are the nuts 5.

The nuts 4 are adapted to contact with the outer face of the plate 3 and the said plate is centrally and integrally formed with an outwardly extending nose 6, and the inner portion of the said nose is preferably flared or otherwise enlarged, as indicated by the numeral 7. The nose 6 is formed with an elongated slot 8.

The nut engaging or locking member is indicated by the numeral 8 and is in the nature of a plate, the central portion of the same being widened and being provided with an opening 9 to receive the nose 6, while a securing element, preferably in the nature of a wedge cotter pin is passed through the elongated opening in the said nose to contact with the outer face of the lapping plate to hold the same in nut engaging position. The bifurcated ends of the cotter pin are turned in opposite directions over the nose to effect in retaining the plate upon the nose and in nut engaging position. By providing the cotter pin in the nature of a wedge member it will be noted that the same contacting with the outer wall of the elongated opening in the nose and the outer face of the locking plate will have a tendency to force the said plate in the direction of the rails and tightly against the nuts 5. The plate 8, at its reduced ends, and upon its inner face, is formed with depressions 11 providing pockets for the nuts 5, and the said reduced portions of the locking plate upon the lower edges thereof, and in a line central with their pockets 11, are provided with rounded depressions 12 to receive the projecting ends of the bolts 4. The flared or thickened inner end 7 of the nose 6 serves as a means for limiting the inward movement of the locking member 8 with respect to the plate 3, so that a space will at all times be maintained between the said plate and the said member 8. This space is desirable for the reason that when the member 8 is to be removed a pinch bar or similar implement may be inserted within the said plate 3 and the said member 8 after the cotter pin has been removed so that the member 8 may be moved outwardly and removed from the nose of the plate 3.

It will also be understood that if desired the plate 2 may be dispensed with as the bolts could pass directly through the openings in the webs of the rail and through the openings in the plate 8, and furthermore that the device is not necessarily restricted for use in connection with the meeting ends of two railway rails.

From the above description taken in connection with the drawings, it will be noted that when the nuts 5 are received in the pocket of the locking plate 8, the same contacting with the walls of the said pockets will be effectively retained against turning upon the bolts, and the arrangement also provides for the protection of the nuts as well as for the bolts as it is obvious that the nuts being received in the rounded depressions which communicate with the pockets and seldom projecting beyond the outer face of the member 8 will be shielded against outside contact from any source, and it is thought the construction and advantages thereof will be perfectly apparent without further detailed description.

Having thus described the invention, what we claim is:

In a nut locking means the combination with a structure adapted to be connected by bolts and nuts, of a plate having openings through which the bolts pass and arranged upon one of the sides of the structure, said plate being centrally and integrally formed with an angular nose which is flared outwardly from its outer to its inner end and which is provided with an elongated slot, nuts screwed on the bolts and contacting with the plate, a substantially rectangular member having a central widened portion which is provided with an opening through which the nose passes, the reduced ends of the member having pockets receiving the nuts and the outer walls of the pockets having their lower edges provided with openings through which the projecting ends of the bolts pass, a wedge inserted through the opening in the nose and contacting with the nut engaging member to force the same in the direction of the plate and to be limited in its movement in such direction by the frictional engagement of the widened portion of the nose with the wall of the opening in the said member, whereby to provide space between the inner face of the nut engaging member and the plate, and the said reduced portions of the nut engaging member spacing the same above the lower edge of the plate.

In testimony whereof we affix our signatures.

HENRY WARNER.
JACOB G. WARNER.

Copies of this patent may be obtained for five cents each, by addressing the "Commissioner of Patents, Washington, D. C."